Nov. 12, 1935.  H. WALKER ET AL  2,020,489
FRAME CHOCK FOR AUTOMOTIVE VEHICLES
Filed March 6, 1931  3 Sheets-Sheet 1
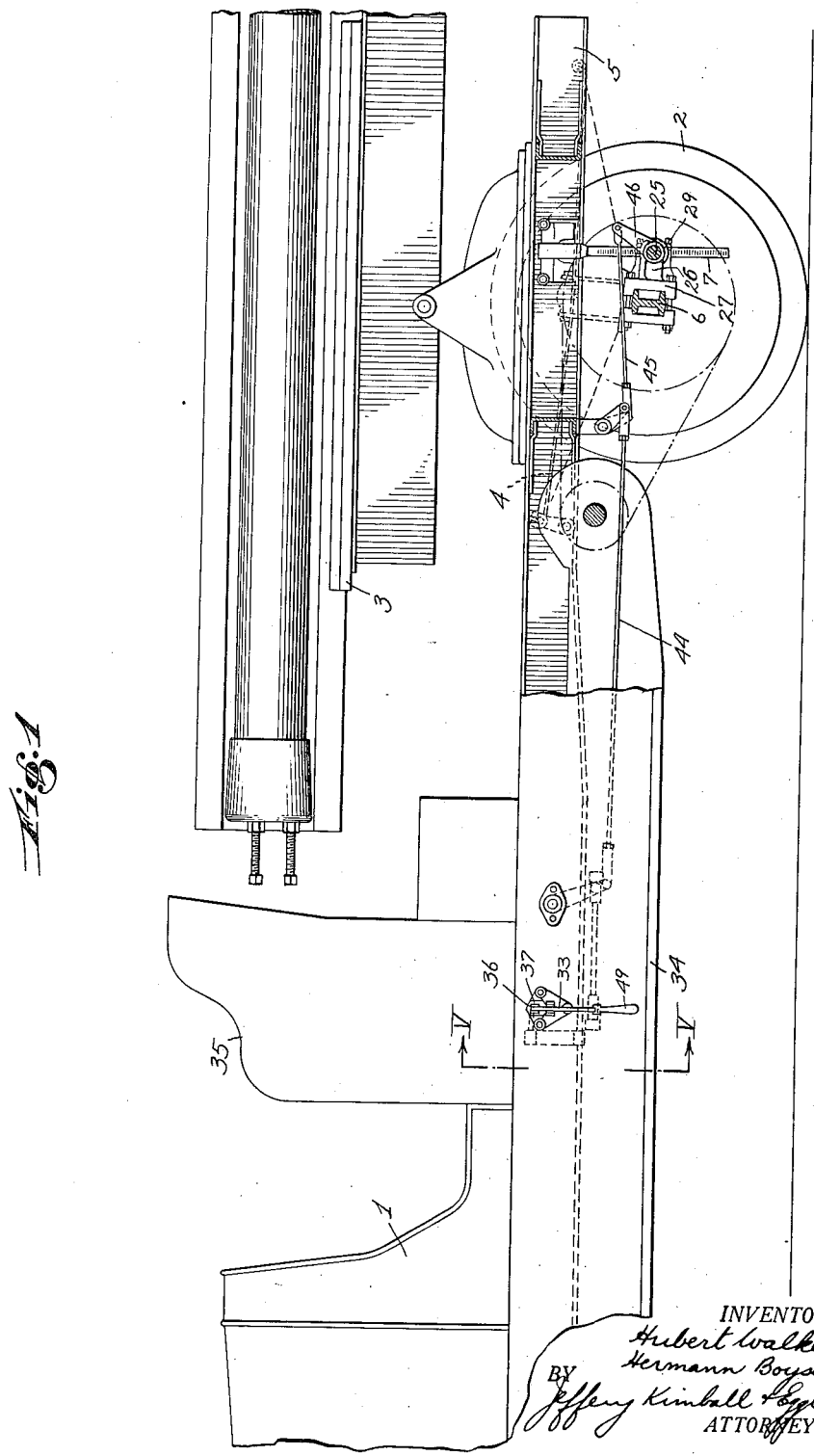

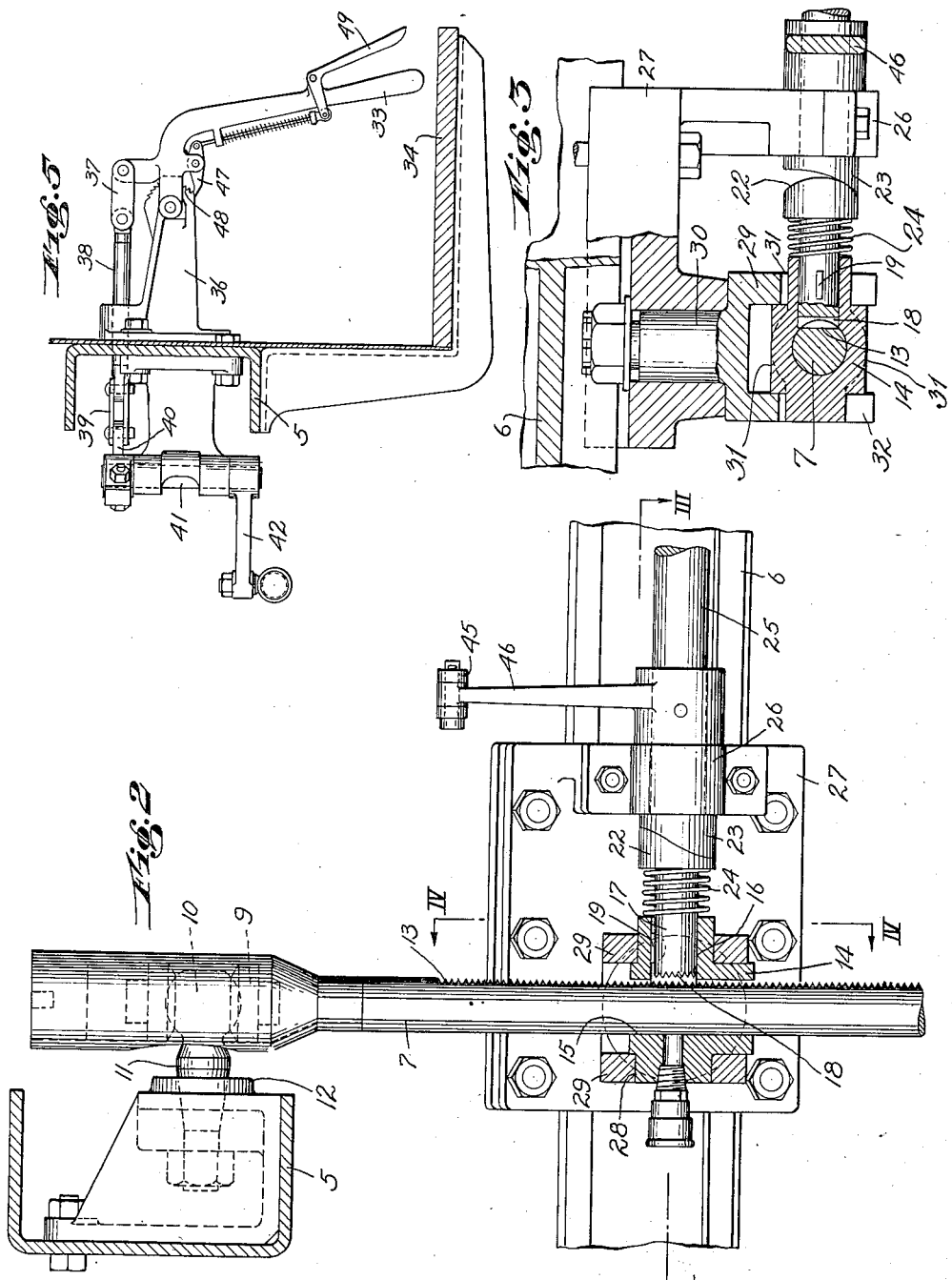

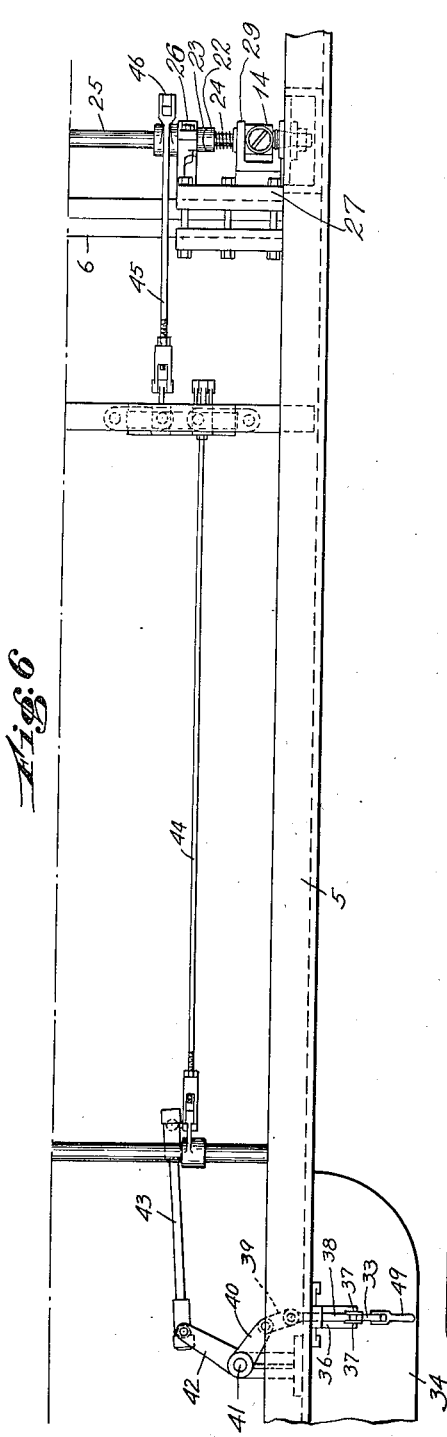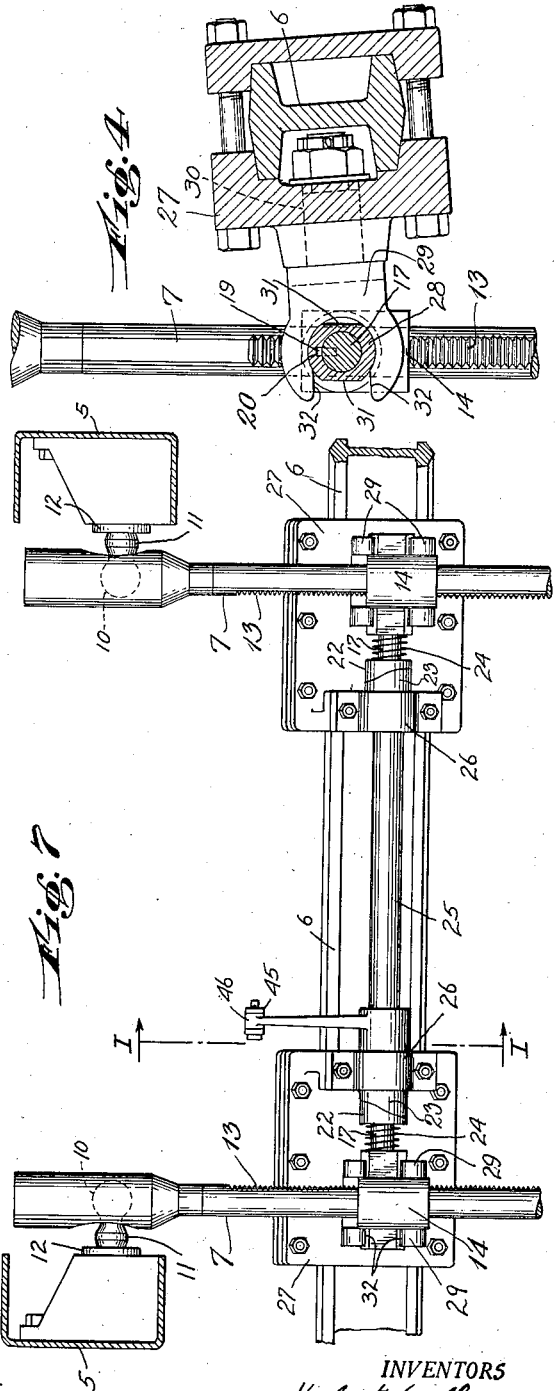

Patented Nov. 12, 1935

2,020,489

UNITED STATES PATENT OFFICE 2,020,489

FRAME CHOCK FOR AUTOMOTIVE VEHICLES

Hubert Walker, Elmira, N. Y., and Hermann Boysen, Philadelphia, Pa., assignors to American La France and Foamite Corporation, a corporation of New York Application March 6, 1931, Serial No. 520,496

7 Claims. (Cl. 280—106)

The invention relates generally to automotive fire trucks and like vehicles designed to transport and serve as a base for the manipulation of aerial ladders or other heavy apparatus and particularly concerns the chocking or stabilizing of the chassis frame of the truck to prevent yielding of the same, on its supporting springs, when the truck is stationary and the apparatus on it is in use.

One of the objects of the invention is the improvement of mechanism for this purpose whereby the sprung and the unsprung members of the vehicle may be locked against the movement normally permitted by the vehicle springs, without regard to the position or degree of compression to which the latter may at the time be subjected, and further objects and advantages touching the safety and convenience of operation of the improved chock and other features thereof will appear from the following description and the accompanying drawings, in which the invention is shown applied to an aerial ladder truck.

Fig. 1 is an elevation, partly sectioned on the line I—I of Fig. 7 of so much of an extension-ladder fire truck as is necessary to an understanding of the invention;

Fig. 2 is an enlarged rear elevation, partially sectioned, of the chock on the left-hand side of the chassis;

Figs. 3 and 4 are sectional views on the lines III—III and IV—IV respectively of Fig. 2;

Fig. 5 is a section on the lines V—V of Fig. 1, showing the operating handle and certain of the control connections;

Fig. 6 is a plan of the control connections between the operating handle on the frame chocks, and Fig. 7 is a rear elevation of the two chocks, and their common operating shaft.

In Fig. 1 will be recognized the body 1 and rear wheel 2 of a type of truck in common use for transporting aerial ladder and like apparatus, the turntable support for which is generally indicated by the numeral 3. The weight of such ladders when elevated and specially when extended laterally of the truck makes it desirable that their base, i. e. the turntable support, which is attached to or part of the sprung truck frame, be quite rigid and to that end the provision is made for supporting the frame by rigid means additional to or independent of vehicle springs 4, which otherwise, by yielding under the weight of the extended ladders make the latter difficult of control and often unsafe to use.

According to our invention the chock mechanism is applied as a permanent fixture to the vehicle between sprung and unsprung parts thereof, as between a frame member 5, which is one of the side girders of the chassis, and the rear axle 6, and is arranged for quick operation at any time to lock such parts against relative movement, regardless of their relative position at the moment.

In the preferred form, which is that illustrated, the chock comprises a brace bar or strut 7, attached to and depending from the side frame member 5, and normally free to slide up and down, plunger-fashion, in a suitable guide carried by the axle 6. Associated with said guide is a locking or clamping mechanism operable to lock the bar against movement in its guide, thereby bracing the vehicle frame and making it rigid with the axle. Two such chocks are preferably provided, one on each side of the frame. It may be found more convenient with certain units to attach the brace bar to the axle and mount the guide and clamping mechanism on the frame but it will be understood that the function will be the same in either event, one end of the brace bar being attached to one of the parts and its other end loosely engaged at all times with the other part.

Referring to Fig. 2, which shows the brace bar in detail, it will be seen that its upper end is constituted as a socket 9 to receive the head 10 of a ball stud 11, the latter supported by bracket 12 on the frame member 5. By this means or any other suitable universal connection the bar, with the appropriate coacting elements below described, is free to accommodate the lateral or longitudinal sway of the frame and body while the truck is in motion. The inner face of bar 7 is provided with corrugations or teeth 13.

The guide for the brace bar (shown in detail in Figs. 2, 3 and 4) comprises a bushing 14, the bar sliding in the vertical bore 15 thereof. In the horizontal bore 16 of the bushing is a bolt member 17, the end of which (adjacent the bar) is also corrugated or toothed as indicated at 18 to fit the bar. While the bolt is slidable in the bushing, the teeth 18 on the end of the former are maintained in constant parallel register with the teeth 13 on the brace bar by a key 19 on the bolt engaging a spline 20 in the bushing (Fig. 4).

On the head of bolt 17 is a face cam 22 which is held in contact with a like cam 23 by spring 24, teeth 18 being normally held out of engagement with teeth 13 by the spring and returned to that position by it whenever permitted by cam 23. Cam 23, which is the operating cam, is formed on the end of a transverse shaft 25 journaled in a bearing 26 which is bolted to a bracket 27, in turn bolted to rear axle 6. The transmission of the truck illustrated being of the chain-drive type, axle 6 is shown as of I-beam section. The contour of cams 22 and 23 is such that when the latter is rotated, bolt 17 is forced into the bushing, and against the brace bar and thereby the frame is locked against movement relatively to the axle. The interlocking of the teeth 13 and 18 makes the connection exceptionally secure.

To accommodate the lateral and longitudinal sway of the frame when the chock is not in use and the vehicle is in motion, bushing 14 is likewise mounted for universal movement relatively to the axle. In the construction illustrated the reduced ends 28 of the bushing are journaled in the arms 29 of a yoke, the stem 30 of which is swivelled in bracket 27 (Fig. 4). Since the lateral movement of the lower end of the brace bar due to the swaying of the frame is only slight, such relative movement as occurs between the cams 22 and 23 is not sufficient to move the bolt the distance necessary to bring its teeth 18 into engagement with the bar teeth 13.

To facilitate assembly, the reduced ends 28 of the bushing 14 are flattened off on each side, as indicated at 31 (Fig. 4), so that the bushing may be passed between the flats 32 on the arms of the yoke and, when turned through ninety degrees and the brace bar passed through it, the bushing is locked against withdrawal.

When two chocks are provided, as ordinarily required, the shaft 25 extends across the vehicle frame, terminating in a like cam and associated with co-operating cam, bolt, brace bar and so forth, identical with those already described, so that the operation of both chocks simply requires the rotation of shaft 25 (Fig. 7) by its operating arm which, as presently described, is intermediate them. The use of the single operating shaft 25 with its cam on each end serves to balance the end thrust resulting from the camming action on the two bolts and, since the latter are engageable with the bars at any point throughout their toothed portions, the chocks are operable in any relative positions of the frame and axle that the existing load may determine. As shown in the drawings the toothed portions of the bars may extend substantially throughout their length, in which event it is immaterial to the operation of the device whether or not the frame is loaded down with additional ladders or other apparatus, and likewise, whether or not the frame is more heavily loaded on one side than the other, as might be the case if the operator should forget to chock the frame until after the ladder had started upwards.

As a matter of convenience in operating the chocks and to avoid the danger of accident incident to the operator getting underneath the truck or near the wheels, the control is preferably located outside of the frame in some readily accessible position and since, as pointed out above, the operation of the chocks simply requires the rotation of shaft 25, it will be apparent that this can be readily accomplished and in a variety of ways.

In the illustrated form a common control handle 33 for the two chocks is shown (Fig. 1) located above the running board 34 immediately accessible to the operator descending from or ascending to the seat 35.

The handle normally hangs down, parallel with the splash apron, from a bracket 36 and the chocks are brought into operation by swinging the handle up into a horizontal position where it extends out over the running board and serves as a visual reminder to the operator to release the chocks before starting up the truck again.

The operating connections between the handle and the chocks are illustrated in Figs. 4 and 5 in which it will be seen that through link 37 the handle actuates a push rod 38 which operates in a bearing in bracket 36. The inner end of rod 38, through link 39 and crank 40 operates a vertical shaft 41 on the lower end of which is a crank 42 which, through rods 43, 44, 45 is tied to lever 46 on the cross shaft 25. On raising handle 33 shaft 25 is thus rotated.

The handle and its associated connections are held in operative position by the pawl and ratchet 47, 48 (Fig. 4) on the bracket 36. To release the chocks, pawl 47 is pulled out of its ratchet by hand-grip 49 and as the handle is lowered springs 24 withdraw the bolts, and the brace bars are then free to reciprocate in their guides under the normal action of the vehicle springs 4.

We claim:—

1. In a truck having a rear axle, a chassis frame member and a spring supporting the same on the axle, a bar depending from said member and connected therewith by a universal joint, a guide for the lower part of the bar carried by the axle and adapted for universal movement relatively thereto, said bar normally free to reciprocate in said guide in accordance with the yield of said spring, and a bolt associated with said guide and operable to lock the bar therein.

2. In an automotive truck chassis, a pair of chocks located between sprung and unsprung parts thereof, one on each side, including a pair of opposed sliding bolts for clamping said parts against relative movement and means located between and in balanced thrust relation to said bolts operable to force the same apart into clamping position.

3. In a truck having a brace bar extending between sprung and unsprung chassis parts thereof for the purpose described and connected with one of said parts by a universal joint, a guide for the other end of the bar connected to the other of said parts and adapted for universal movement relatively thereto, and means associated with said guide operable to lock the bar against movement therein.

4. In a truck having a brace bar extending between sprung and unsprung chassis parts thereof and connected to one of them, a guide for the bar connected to the other of said parts by a universal joint, a locking bolt for the bar mounted in said guide in predetermined relation to the bar and bolt operating means mounted independently of the bolt on said guide-supporting part.

5. In a truck having a pair of brace bars extending between sprung and unsprung parts of the chassis, one at each side thereof and each attached to one of said parts, and guides for said bars attached to the other of said parts and freely accommodating the bars to relative movement of said parts during normal running of the truck, the combination therewith of sliding bolt members mounted in axial alignment, one in each of said guides, and means for moving them toward and from each other into and out of locking engagement each with its adjacent brace bar.

6. In a truck having a pair of brace bars extending between sprung and unsprung parts of the chassis, one at each side thereof and each attached to one of said parts, and guides for said bars attached to the other of said parts and freely accommodating the bars to relative movement of said parts during normal running of the truck, the combination therewith of sliding bolt members mounted in axial alignment, one in each of said guides, and cam means intermediate and engaging the adjacent ends of said bolts and operable to move the latter into locking engagement with their adjacent brace bars.

7. In a truck having a pair of brace bars extending between sprung and unsprung parts of the chassis, one at each side thereof and each attached to one of said parts, and guides for said bars attached to the other of said parts and freely accommodating the bars to relative movement of said parts during normal running of the truck, the combination therewith of sliding bolt members mounted in axial alignment, one in each of said guides, an operating shaft mounted between and coaxially with said members, the opposite ends of said shaft having cam surfaces engaging the adjacent bolt members, whereby rotation of said shaft simultaneously thrusts both bolt members into locking engagement with their respective brace bars.

HERMANN BOYSEN.
HUBERT WALKER.